United States Patent [19]

Menen

[11] Patent Number: 5,019,677
[45] Date of Patent: May 28, 1991

[54] COMPUTER INPUT DEVICE

[75] Inventor: Balan Menen, Orange, Calif.

[73] Assignee: Microslate Corp., Costa Mesa, Calif.

[21] Appl. No.: 551,621

[22] Filed: Jul. 11, 1990

[51] Int. Cl.⁵ ............................................ G08C 21/00
[52] U.S. Cl. ................................... 178/18; 340/709; 338/131
[58] Field of Search ............... 178/18, 19; 340/709, 340/706; 338/133, 48, 131

[56] References Cited

U.S. PATENT DOCUMENTS

| | | | |
|---|---|---|---|
| 4,005,400 | 1/1977 | Engdahl | 340/365 |
| 4,092,532 | 5/1978 | Hayes | 250/221 |
| 4,121,049 | 10/1978 | Roeber | 178/18 |
| 4,214,122 | 7/1980 | Kley | 178/18 |
| 4,445,552 | 6/1984 | Schuyler | 178/18 |
| 4,448,837 | 5/1984 | Ikeda et al. | 428/215 |
| 4,475,008 | 10/1984 | Doi et al. | 178/18 |
| 4,476,463 | 10/1984 | Ng et al. | 340/712 |
| 4,550,316 | 10/1985 | Whetstone | 340/710 |
| 4,564,079 | 1/1986 | Moore et al. | 178/18 |
| 4,570,149 | 2/1986 | Thornburg et al. | 338/114 |
| 4,638,118 | 1/1987 | Wang et al. | 178/18 |
| 4,656,317 | 4/1987 | Tsugei et al. | 178/18 |
| 4,659,873 | 4/1987 | Gibson et al. | 178/18 |
| 4,670,743 | 6/1987 | Zemke | 340/709 |
| 4,680,577 | 7/1987 | Straayer et al. | 340/711 |
| 4,692,756 | 9/1987 | Clark | 340/709 |
| 4,905,007 | 2/1990 | Rohm | 340/709 |

Primary Examiner—Stafford D. Schreyer
Attorney, Agent, or Firm—William J. Kearns

[57] ABSTRACT

A computer input device for positioning a cursor on a computer video screen. With this device information is put into the computer by the penmanship motion of the hand holding a stylus in the fashion of a writing instrument so that only finger motion is required for data input. Device replaces the arm-to-eye coordination of the mouse with hand-to-eye coordination such as that used in ordinary penmanship. Rather than encoders driven by a turning ball or wheels, a resistance array with wiper contacts produces variable resistances which are converted into variable voltages that are a function of position of the stylus.

7 Claims, 4 Drawing Sheets

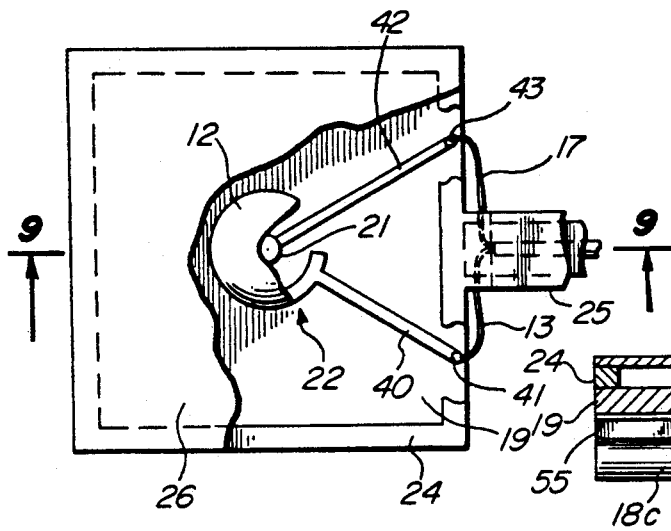
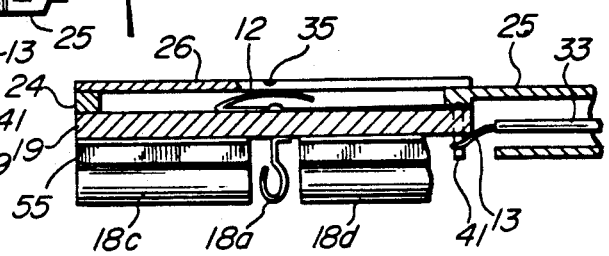
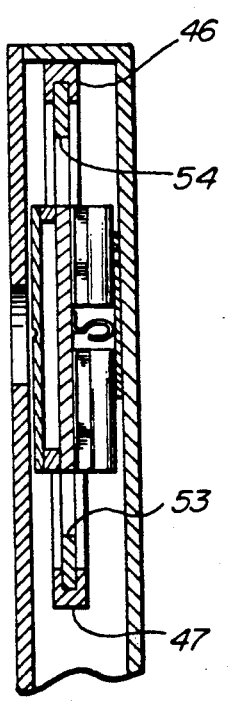
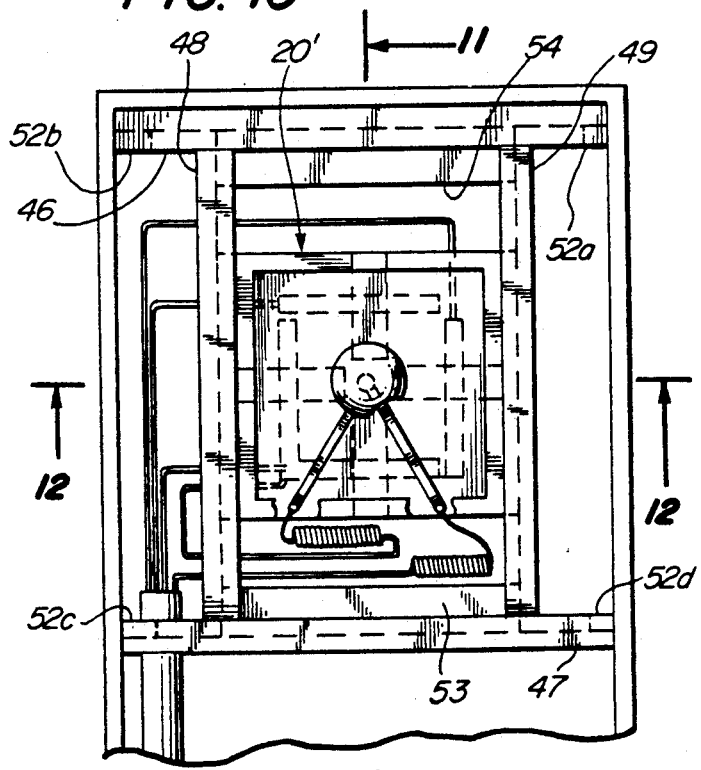
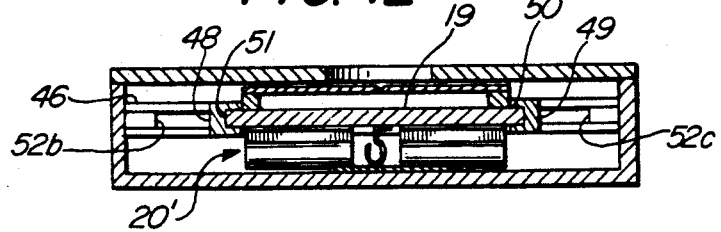

COMPUTER INPUT DEVICE

BACKGROUND OF THE INVENTION

This invention relates in general to computer input devices and in particular to devices for positioning a cursor on a computer screen. For many years the standard computer keyboard has been used for this purpose. However, for many spatial positioning applications, particularly those involving menudriven systems and graphics, the keyboard method is rather slow and difficult to use. Many computers now have a computer input device called a "mouse" that translates arm and hand motion into x-y information to position the cursor on the computer screen. The device, a small, hand-held unit attached to the computer by an umbilical cord or cable, can be moved over a smooth surface such as a desk or work table, moving internal parts which generate signals proportional to the distance the device moves. Operating potentials for the device and output signals from the device are conducted to and from the computer by way of the umbilical cord and processed by an input device to the computer into x and y positions of the cursor on the screen.

Early versions of the mouse utilized potentiometers or variable resistances driven by a ball or wheel projecting through the bottom of the device in contact with a smooth, frictional surface against which the ball or wheel rolls as it is moved over the surface. For the x axis the rotation produces a signal proportional to the amount of rotation for the left and right motion or x direction; in the same manner another potentiometer at a right angle to the first produces a signal for the vertical or y positioning of the cursor on the screen. These first devices worked quite well and were considered an improvement over the keyboard method of cursor positioning. However, the mechanical complexity and the level of resolution of the variable resistance elements of the potentiometers required for accurate positioning were costly and sometimes resulted in low reliability and short life. To increase the reliability of the mouse, optical disc encoders replaced the potentiometers. Optical disc encoders measure the amount of rotation about the x and y axes by optically counting radial stripes on the periphery of the discs and electronically translating the counts into x and y positions of the cursor.

Regardless of the method of generating the electrical signals, positioning the cursor requires coordination between eye and arm to produce a motion similar to that required for locating the position of a paintbrush. This coordinated motion is acquired by practice, but the learning time and ease of use depend upon the level of the operators hand-to-eye motor capability, just as they do when developing a skill for painting. A fairly large desk area usually is needed to obtain full screen motion of the cursor and a correspondingly large range of motion of hand and arm.

SUMMARY OF THE INVENTION

This invention comprises an improved computer input device for manually positioning a cursor on a computer screen by replacing arm motion with penmanship finger motion. The eye-to-finger, or penmanship, coordination needed to use the new device is easier to acquire than the eye-to-arm coordination required with existing computer input devices. The range of motion is thereby reduced to that of handwriting. This invention addresses the tasks of reducing the need for a large range of motion, eliminating the eye-to-arm coordination skill required to operate existing devices, and lowering costs.

It is therefore an object of this invention to reduce the amount of hand and arm motion required for positioning a cursor accurately and quickly on a computer monitor.

It is a further object of this invention to replace the need for arm-to-eye coordination with finger-to-eye coordination by utilizing the penmanship skills almost everyone has developed to a high degree and reinforces daily when writing.

Yet another object of this invention is to provide the advantages of the reduced motion and smaller size at lower cost than existing devices.

BRIEF DESCRIPTION OF THE DRAWINGS

FIG. 8 is an enlarged top view of the slider assembly with the compliant top member cut away to show the center switching means.

FIG. 9 is an enlarged cross section of the slider assembly.

FIG. 10 is a partial top plan view of the complete assembly of a second embodiment showing the slider assembly held in the positioning mechanism. The cover is removed for clarity.

FIG. 11 is a partial cross section along line 11—11 of FIG. 10; the cover is in place.

FIG. 12 is a cross section along 12—12 of FIG. 10 with the top cover in place.

DESCRIPTION OF THE PREFERRED EMBODIMENT

Figure 1:
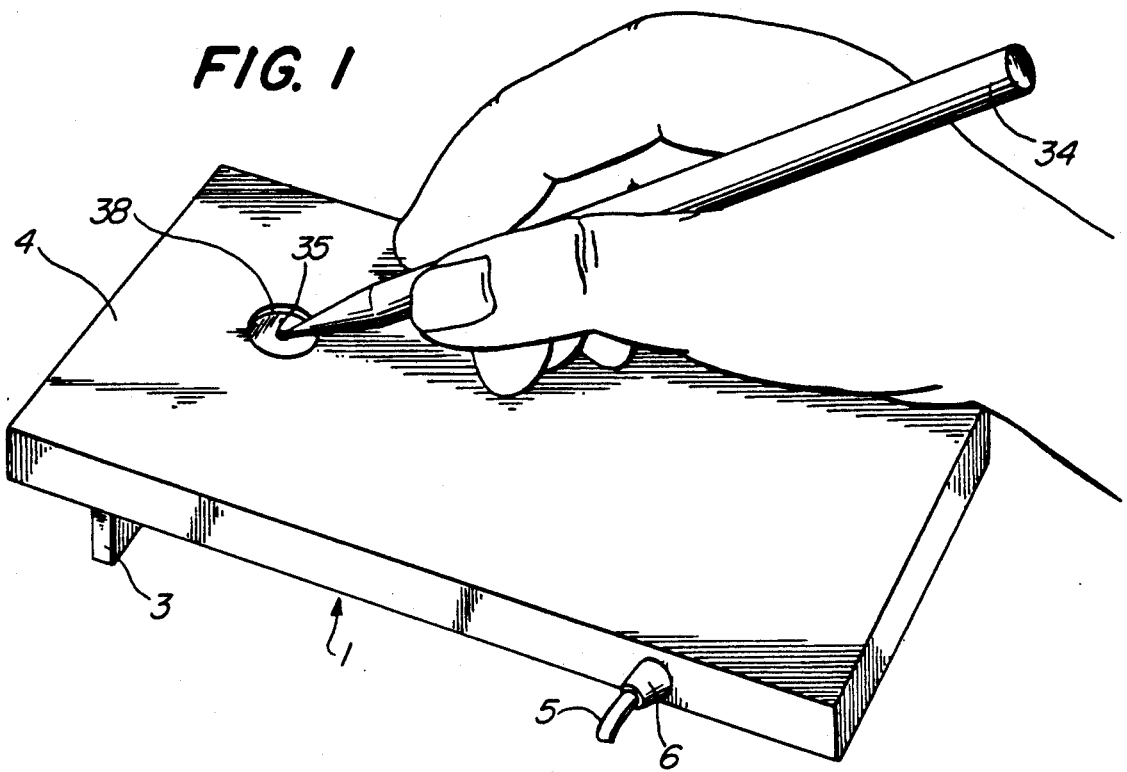
FIG. 1 is a perspective view of the assembled invention as it is used.

The mode of operation of this invention is best understood by referring to FIG. 1 that shows how a stylus is held and used in the fashion of a pen or pencil to produce a mechanical action in the aperture in the top cover of the device. This mechanical action is translated into electrical signals by a slidable circuit or sliding circuit components; the signals are then processed by software to control movement of a cursor on a display screen of a computer Thus, the invention is, in effect, an electromechanical transducer that produces an electrical signal for every position of the point of the stylus. The transducer delivers that signal to a computer terminal through an appropriate circuit to set the position of the cursor at any point on the screen that the operator desires.

Figure 2:
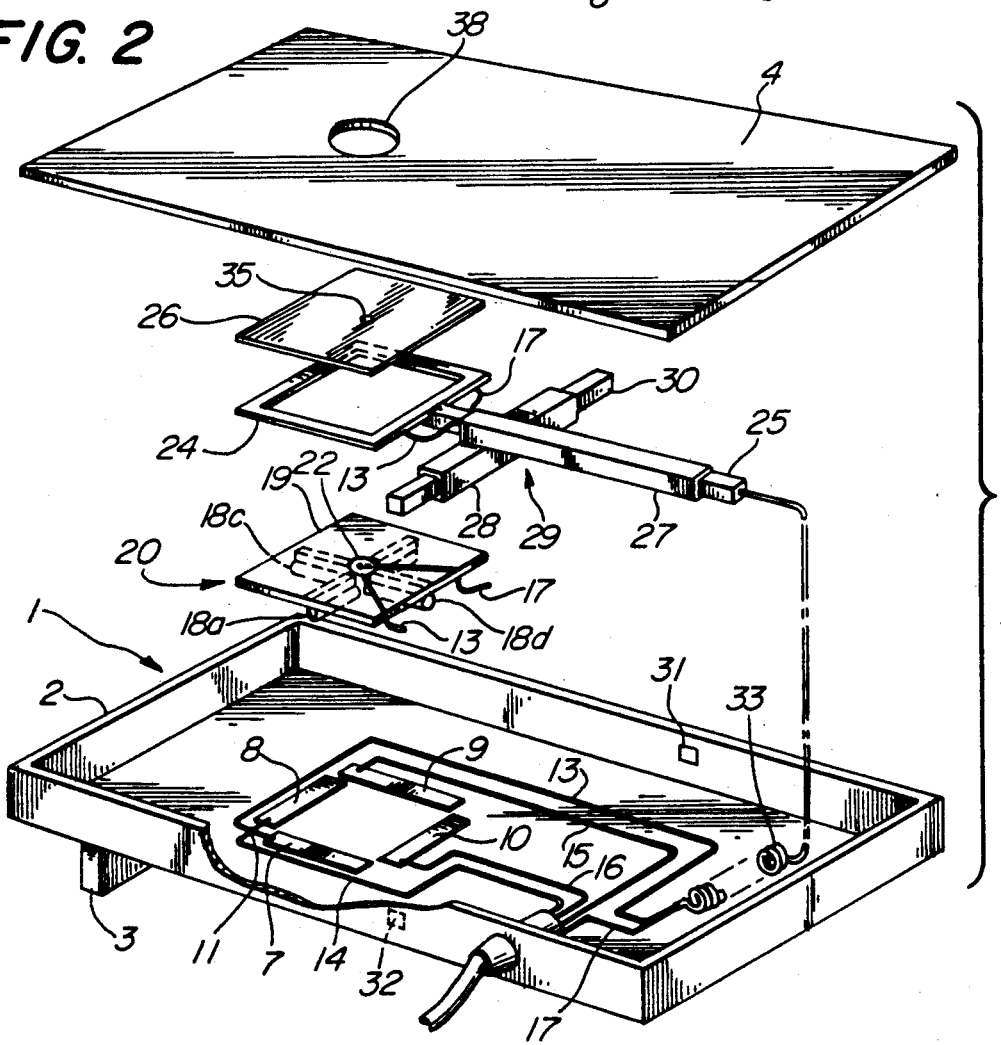
FIG. 2 is an exploded perspective view of the assembly showing the bottom box of the enclosure, internal parts and top cover. Some of the interconnecting wires are omitted for clarity.

FIG. 2 is an exploded view of the mechanism inside the enclosure comprising the body of the invention indicated generally as 1. An early form of the preferred embodiment is shown in FIGS. 2 through 9. In FIG. 2 the enclosure is shown as a shallow box 2 which may be made of one piece of thermoformed plastic material such as ABS, one piece stamped or drawn metal, or it may be assembled from individual end, side, and bottom members. Top cover 4, sealed to the walls of box 2, completes the enclosure and serves as a load-bearing, "writing" surface which supports the weight of the hand manipulating the stylus. Support 3 raises the back end of the mechanism so that the "writing" surface of cover 4 is sloping at an angle for comfortable use. For aesthetic reasons the slope can be made to match the slope of the computer keyboard if the keyboard slope is correct for comfortable hand position. The periphery of the opening in cover 4 is symmetrical about the center of motion of the stylus.

Referring to FIG. 2, connecting cable 5 enters enclosure 1 through a vertical wall of the enclosure 2 and is anchored by grommet 6. Resistors 7, 8, 9, and 10, having identical electrical and physical charactistics, are arranged symmetrically about the center of motion of the stylus. Also located about the center of motion is an interactive switching means, shown generally as 22 in FIGS. 2, 3A, and 8, that allows the operator to send a command signal to the computer at a specific location of the cursor. The interactive switching means will be described in more detail below. Resistors 7, 8 and outer switch contact 12 of switching means 22 are tied electrically to a common point 11. Wire 13 connects outer switch contact 12 to common point 11, and wire 14 is the return line to the computer. Resistor 9, connected by wire 15, and resistor 10, connected by wire 16, are also connected to resistors 7 and 8 respectively by way of contact springs 18a through 18d; the details of the circuit are discussed below. The part to which the contact springs 18a through 18d and outer switch contact 12 are fastened is bottom member 19; the moving unit is designated generally as slider assembly 20. Bottom member 19 of slider assembly 20 is attached to support frame 24 which in turn is attached to hollow support arm 25. A compliant top member 26, attached to the top of support frame 24, completes the slider assembly 20. Support arm 25 is slidably contained within member 27 which is rigidly attached at a right angle to member 28; members 27 and 28, when assembled, form a positioning yoke designated generally as 29. Yoke 29 is slidably and non-rotatably supported by support member 30 attached rigidly to the walls of box 2 at points 31 and 32. Lightweight, flexible cable 33 contains wires 13 and 17 for electrical connection of switching means 22 to cable 5 for connection to the computer through cable 5. For ease of illustration a mechanical dome switch has been shown for the switch means. However, any vertically sensitive transducer element responding to a vertical force of the stylus that produces a signal which can be correlated with the position of the cursor on the computer screen may be used instead. Such a switching means can be a miniature load cell, a piezo-electric device, a resistance or any other transducing material sensitive to vertical motion or force.

The operation of the positioning mechanism for slider assembly 20, as it is supported by positioning yoke 29, can be understood by referring to FIGS. 3A, 3B, 4, and 5. Yoke 29 is fixed in position by support bar 30 which is a solid bar of nominally square cross section fastened securely to the longer, vertical walls of enclosure 2. Hollow member 28 of yoke 29 closely fits bar 30 with just enough clearance to allow free, sliding motion in the x direction, or the operator's left to right, but no motion in the y direction which is away from or toward the operator. Hollow member 27 of yoke 29, securely fastened at a right angle to member 28, slidably holds hollow support bar 25 which is securely fastened to support frame 24 so that slider assembly 20 can move freely in the y direction. To position the slider assembly, the operator moves stylus 34, which engages indentation 35 in compliant top member 26, to the right or left and toward or away from the center of motion. Thus slider assembly 20 can be located anywhere within the area defined by opening 38 in top 4. The cursor on the computer monitor is correspondingly located on the screen, the exact position on the screen being determined by hand-to-eye coordination of the operator. Operating experience has shown that the required amount of hand-to-eye coordination for this invention is much easier to achieve and more quickly learned than the full arm-to-eye coordination required by most existing cursor positioning devices.

Figure 3A:
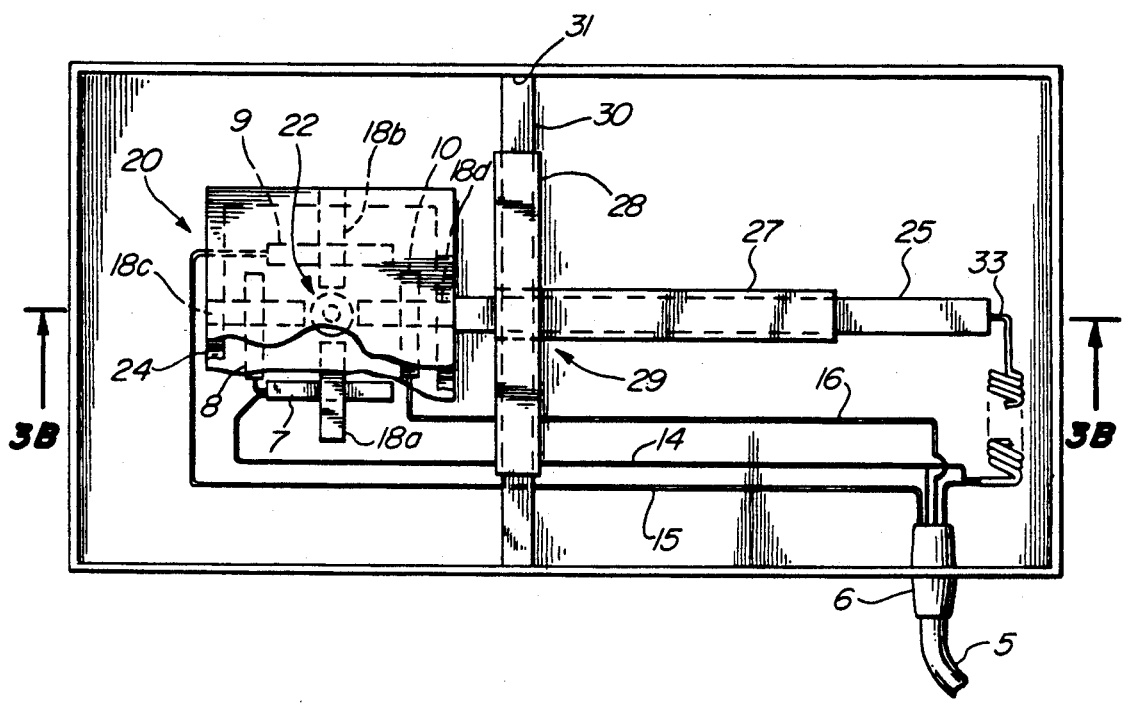
FIG. 3A is a plan view of the inside of the bottom box of the enclosure showing the slider assembly positioned above the the fixed resistances and the positioning mechanism.
Figure 3B:
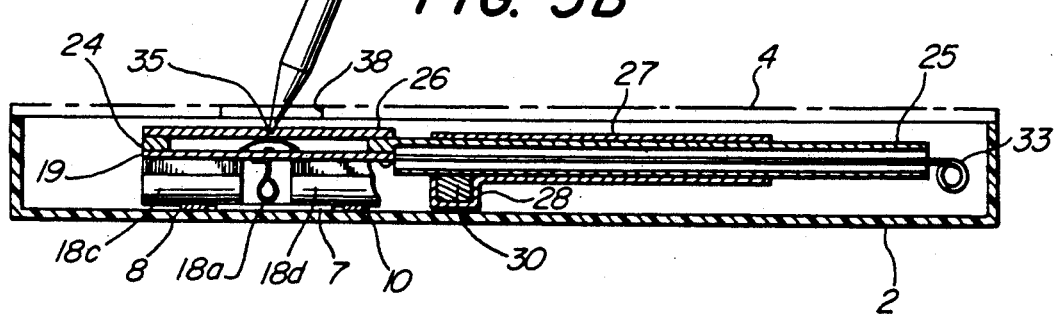
FIG. 3B is a cross section along line 3B—3B of FIG. 3A showing the stylus in operating position. The enclosure top cover is shown in phantom.
Figure 4:
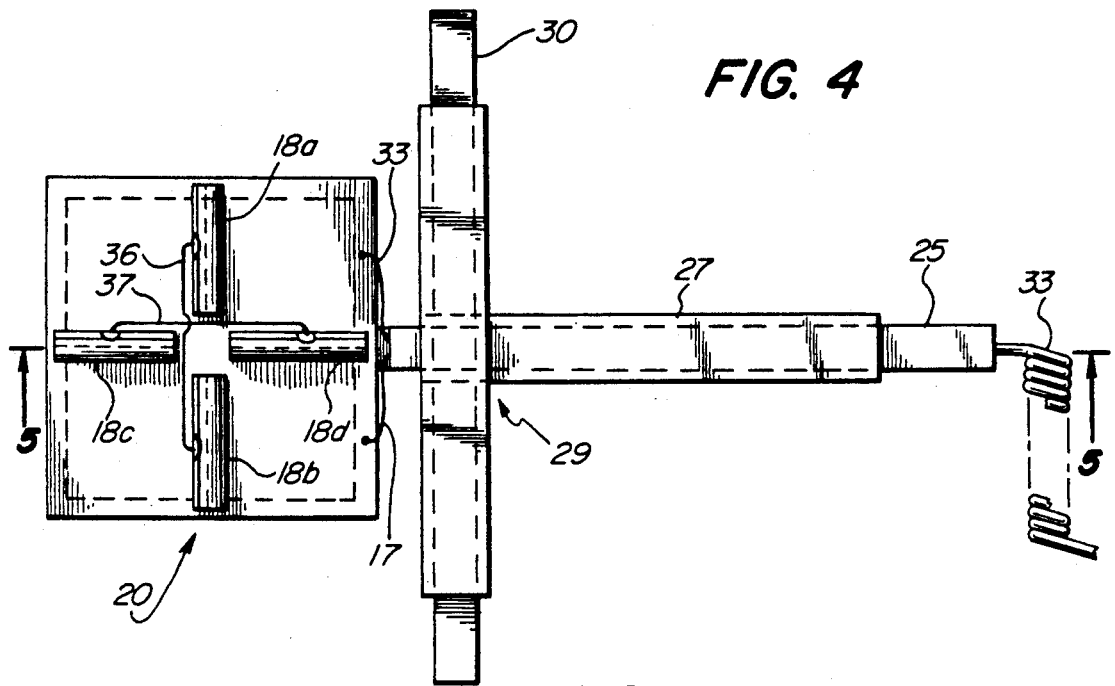
FIG. 4 is an enlarged bottom view of the slider assembly and positioning mechanism showing the wiring connections to the contact springs and connecting leads to the switching means.
Figure 5:
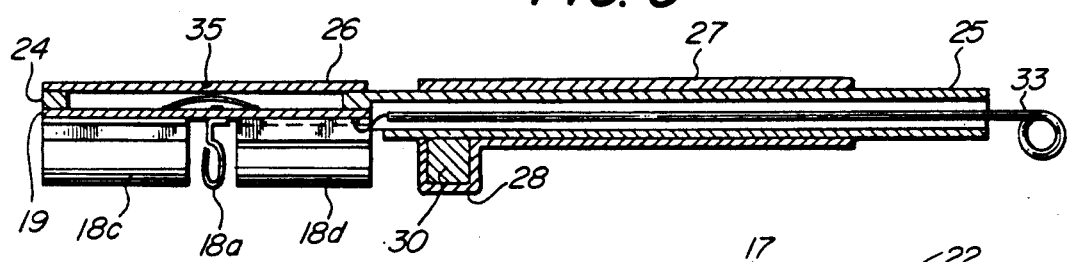
FIG. 5 is a cross section taken along line 5—5 of FIG. 4.
Figure 7:
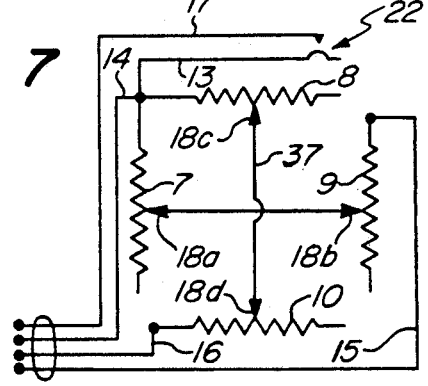
FIG. 7 is the electrical schematic for the wiring.

The conversion of the mechanical position of the slider into an electrical signal which is used to position the cursor occurs in the circuit shown in FIG. 7. FIG. 4 shows contact springs 18a through 18d mounted on bottom member 19; contact 18a and 18b are connected electrically by wire 36 and contacts 18c and 18d are connected electrically by wire 37. When slider assembly 20 is in operating position as shown in FIG. 3B, the contacts 18a, 18b and wire 36 connect resistors 7 and 8, and similarly contacts 18c, 18d and wire 37 connect resistors 9 and 10. The axes of contact springs 18a and 18b are located on a line passing through the center of motion of the slider at a right angle to the long dimension of resistors 7 and 9. These axes are spaced so that spring 18a is centered over resistor 7 and spring 18b is centered over resistor 9 when slider assembly 20 is in the home position. Similarly, the axes of contact springs 18c and 18d are on a line passing through the center of motion of the slider at a right angle to the long dimensions of resistors 8 and 10. These axes are spaced so that spring 18c is centered over resistor 8 and spring 18d is centered over resistor 10 when slider assembly 20 is in the home position. The range of motion of slider assembly 20 is limited in the x and y directions so that contact springs 18a through 18d make contact with their corresponding resistors substantially over their entire lengths, with allowance being provided for end effects.

The four resistors 7 through 10 are identical physically and electrically and typically have a resistance R in the range of 1,000 to 10,000 ohms. In the preferred embodiment the resistance is set at 1,500 ohms. The actual value is not critical but has limits set by high current demand if the resistance is too low and electrical noise pick-up if the resistance is too high. The range of resistance for both the x and y axes is from substantially zero at one end of contact motion to substantially 2R at the other end. At the center point which corresponds to the center position of the cursor on the computer screen, the resistance is R. The variable resistances for each axis provide resistance values for each value of x and y. These resistance values, in conjunction with an external voltage source, provide a voltage signal directly proportional to the x and y displacements of the stylus and are used to position the cursor on the computer screen.

Figure 6A:
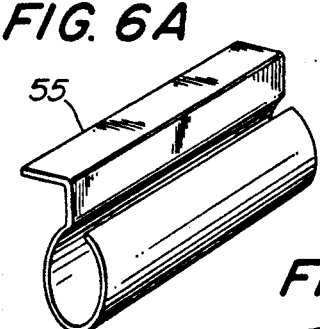
FIG. 6A is a perspective view of the slider switching means for the preferred embodiment.
Figure 6B:
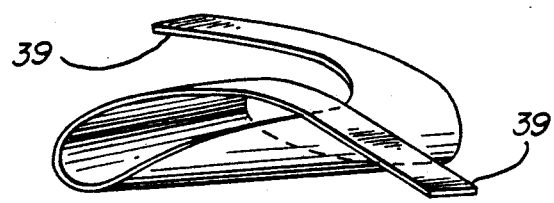
FIG. 6B is a perspective view of a second embodiment for a slider contact spring.

The height of the bottom member 19 above the base of enclosure 2 is determined by the location of anchor bar 30. This location depends upon the thickness of resistors 7 through 10 and the dimensions of contact springs 18a through 18d. The springs themselves, which are made of any suitable contact spring material such as phospor bronze or beryllium copper, must have enough compliance for reliable contact yet not be so stiff as to cause undue wear on the resistors or the sliding yoke members Two spring configurations are shown in FIGS. 6A and 6B. The spring of FIG. 6A as used in the preferred embodiment is a simple, elliptically shaped cylinder mounted by means of mounting flange 38, with the axis of the ellipse parallel to the plane of bottom member 19. The spring of FIG. 6B has two mounting tabs 39 and is mounted with the axis of the cylindrical part of the spring parallel to bottom member 19.

In addition to providing an electrical signal for cursor positioning, slider assembly 20 also contains an interactive switching means shown generally as switch 22 in FIG. 8. This awitching means sends a signal to the computer at a particular cursor position for such tasks as making menu selections, setting the point of origin for a line, or choosing a color for a particular area of the computer screen. Switch 22 is placed at the center of bottom member 19 as can best be seen with reference to FIGS. 8 and 9. Switch 22 can be any type of pressure switch or device sensitive to vertical force or motion as discussed above, but for illustration of the operation of the preferred embodiment, a dome switch comprising outer contact 12 and inner contact 21 is used. Outer contact 12 is a flexible, elastic contact connected by conductor 40 to post 41 and then to wire 13; inner contact 21 is connected by conductor 42 to post 43 and then to wire 17. Wires 13 and 17 pass through the hollow support arm 25 to cable 5 through flexible pigtail 33. When slider assembly 20 has been positioned by stylus 34, acting through the center of compliant top member 26 at indentation 35, so that the cursor is at a desired spot in the computer screen, slight additional force on stylus 34 closes the contacts of command switch 22, thereby instructing the computer to perform a task as described above. Conductors 40 and 42 are separated from the spring contacts 18a through 18d by the thickness of slider base plate 19 and therefore do not interfere electrically with each other. It should be noted here that the connections on either side of slider base plate 19 may be hard wired or printed circuit conductors. Slider top member 26 is selected to have the proper degree of compliance so that ordinary writing force will produce easy movement of the slider by the stylus 34 without actuating switching means 22, yet will allow switch contact to be made with only slight incremental force being required at the stylus.

A second embodiment for controlling the cursor position is shown in FIGS. 10 through 12. A pair of grooved stationary rails 46 and 47 are mounted at a right angle to a pair of grooved, movable rails 48 and 49. Slider assembly 20', modified from slider assembly 20 only by the addition of side tongues 50 and 51, is held slidably in grooved, movable rails 48 and 49 in tongue and groove fashion. Rails 48 and 49 are held in proper spaced relationship to slider assembly 20' by rigidly attached spacer bars 53 and 54 which extend beyond rails 48 and 49 and rest slidably in mating grooves in stationary rails 46 and 47 in tongue and groove fashion Stops 52a through 52d are used to set the limits of motion of slider assembly 20' in the left to right, or x, direction; spacer bars 53 and 54 are dimensioned to limit the vertical, or y, direction of motion of slider assembly 20'. Thus the positioning motion of yoke 29 is duplicated by the modified assembly of the second embodiment but with the added features of increased rigidity and ruggedness over the preferred embodiment. All other features of the second embodiment such as the springs, resistors, switching means, enclosure and cabling are identical with the preferred embodiment.

Although materials used for construction of this invention have not been discussed at length, they are not critical to the operation of the invention since they may be chosen from a wide range of materials available to those skilled in the art. For example, thermoforming plastics, such as ABS or PVC, have been used for the enclosures and sliding members of the preferred embodiments described above; other structural materials from other classes of plastics, and metals can be used. The spring materials can be from the classes of metals including phosphor bronze alloys and beryllium copper alloys. The resistive strips used for the resistances are of the type used in linear potentiometers; any resistive material of suitable resistivity and wearability can be used. The electrical circuit, in each of the two embodiments discussed above, comprises a fixed resistor network attached to the bottom of the enclosure and in electrical contact with a sliding contact means on a slider assembly. It will be apparent to one skilled in the art that the resistors or other circuit components can be located on the slider assembly, and the sliding contact can be located on the bottom of the case, if, for example, it would facilitate manufacture of the device. For clarity the motion of the positioning mechanism has been described in terms of x and y axes through the center of motion and nominally parallel to the sides of the enclosure. The only requirement that must be met by the positioning mechanism is that the two axes of motion are mutually orthogonal. These axes need not be be parallel to any other fixed frame of reference if it is convenient to choose some other orientation for the positioning mechanism.

What is claimed is:

1. A computer input device for positioning a cursor on a computer display screen requiring only penmanship motion to move a stylus comprising in combination:

an enclosure;
a slidable circuit;
a stylus;
said enclosure serving as a support for a hand holding said stylus, the stylus movably engaging said slidable circuit, thereby generating cursor coordinate signals and computer command signals at any cursor location on said computer display screen.

2. A computer input device for positioning a cursor on a computer display requiring only penmanship motion to move a stylus comprising in combination:

an enclosure;
a positioning mechanism;
a slider assembly;
an electrical circuit;

a stylus;

said enclosure comprising a bottom box inclined at a small angle from the horizontal and closed by a top cover containing an aperture and serving as a support surface for a hand holding said stylus, the bottom box and top forming an enclosure that provides support and containment for said positioning mechanism, said slider assembly and said electrical circuit;

said positioning mechanism being anchored inside the enclosure and having said slider assembly attached thereto, the positioning mechanism constraining the slider assembly to move in parallel proximity to the top cover of the enclosure in two mutually orthogonal directions with the center of motion congruent with the center of said aperture in the top cover;

said slider assembly comprising a top member adjacent said top cover and a bottom member adjacent said electrical circuit, the top member being compliant toward said bottom member and having an indentation located at the center of motion of the slider assembly and engaging said stylus projecting through the aperture, said bottom member being in sliding electrical contact with, and forming part of, said electrical circuit;

said slider assembly furthur comprising a switching means between the top and bottom members and concentric with said indentation; and said stylus moving the slider assembly laterally as governed by said positioning mechanism, thereby generating coordinate signals proportional to the position of the stylus, and vertically to actuate said switching means through the compliance of the top member, thereby generating a command signal at any coordinate position.

3. A computer input device for positioning a cursor on a computer display requiring only penmanship motion to move a stylus comprising in combination:

an enclosure;
a positioning mechanism;
a slider assembly;
an electrical circuit;
a stylus;
a connecting means;

said enclosure comprising a shallow bottom box inclined at a small angle from the horizontal and closed by a parallel top cover containing an aperture and serving as a support surface for a hand holding said stylus, the bottom box and top forming a rectangular parallelopiped enclosure that provides firm support for said positioning mechanism and containment for said slider assembly and said electrical circuit;

said positioning mechanism being tee-shaped, securely anchored inside the enclosure and having said slider assembly attached thereto, said positioning mechanism comprising a first sliding means operative in the cross-tee direction only and a second sliding means operative at a right angle in the other tee direction only, thereby constraining the slider assembly to move in parallel proximity to the top cover of the enclosure in two mutually orthogonal directions, with the center of motion congruent with the center of said aperture in the top cover;

said slider assembly comprising a top member adjacent said top cover and a bottom member adjacent said electrical circuit, the top member being compliant toward said bottom member and having an indentation located at the center of motion of the slider assembly and engaging said stylus projecting through the aperture, said bottom member being in sliding electrical contact with, and forming part of, said electrical circuit;

said slide assembly furthur comprising a switching means between the top and bottom members and concentric with said indentation; and said stylus moving the slider assembly laterally as governed by said positioning mechanism, thereby generating coordinate signals proportional to the position of the stylus, and vertically to actuate said switching means through the compliance of the top member, thereby generating a command signal at any coordinate position.

4. A computer input device for positioning a cursor on a computer display requiring only penmanship motion to move a stylus comprising in combination:

an enclosure;
a positioning mechanism;
a slider assembly;
an electrical circuit;
a stylus;
a connecting means;

said enclosure comprising a shallow bottom box inclined at a small angle from the horizontal and closed by a parallel top cover containing an aperture and serving as a support surface for a hand holding said stylus, the bottom box and top forming a rectangular parallelopiped enclosure that provides firm support for said positioning mechanism and containment for said slider assembly and said electrical circuit;

said positioning mechanism comprising two fixed cee-shaped rails securely anchored to the enclosure and slidably supporting two moving cee-shaped rails held therein in tongue and groove fashion, and said moving rails slidably supporting said slider mechanism in tongue and groove fashion, thereby constraining the slider assembly to move in parallel proximity to the top cover of the enclosure in two mutually orthogonal directions with the center of motion congruent with the center of said aperture in the top cover;

said slider assembly comprising a top member adjacent said top cover and a bottom member adjacent said electrical circuit, the top member being compliant toward said bottom member and having an indentation located at the center of motion of the slider assembly and engaging said stylus projecting through the aperture, said bottom member being in sliding electrical contact with, and forming part of, said electrical circuit;

said slider assembly furthur comprising a switching means between the top and bottom members and concentric with said indentation; and said stylus moving the slider assembly laterally as governed by said positioning mechanism, thereby generating coordinate signals proportional to the position of the stylus, and vertically to actuate said switching means through the compliance of the top member, thereby generating a command signal at any coordinate position.

5. A computer input device as in claim 3 or 4 wherein said circuit further comprises:

a resistance array;
a set of four pliant contacts;
said resistance array having four interconnected resistance elements of resistance R fastened to the internal surface of said bottom closure and forming a rectilinear array symmetrically located with respect to the center of motion of said slider assembly, and with sides parallel to the directions of motion; said set of four pliant contacts arranged radially about said center of motion and positioned symmetrically and orthogonally with respect to said resistance array, a pair of said pliant contacts being connected together and in sliding contact with two resistance elements parallel to one direction of motion and the other pair of pliant contacts similarly connected and in sliding contact with the resistance elements parallel to the other direction of motion; and said resistance elements being of such a length and so spaced that, over the extremes of travel of the slider assembly, each pair of pliant contacts is always in electrical contact with the resistance elements opposite it and no other, thus forming two variable resistances, one for each direction of motion, each having a resistance value proportional to a coordinate position of the slider assembly.

6. A computer input device as in claim 5 wherein:

said resistance elements, each having a resistance of R ohms, are connected so that, in each of the slider assembly travel directions, each variable resistance ranges from substantially zero to substantially 2R.

7. A computer input device as in claim 6 wherein:

said resistance elements have a resistance value R in the range of 1,000 to 10,000 ohms.

* * * * *